United States Patent Office.

JAMES WEBSTER, OF SOLIHULL, COUNTY OF WARWICK, ENGLAND.

MANUFACTURE OF SOLUBLE ALUMINA.

SPECIFICATION forming part of Letters Patent No. 252,982, dated January 31, 1882.

Application filed July 25, 1881. (No specimens.) Patented in England June 14, 1881.

*To all whom it may concern:*

Be it known that I, JAMES WEBSTER, residing at Solihull, in the county of Warwick, Great Britain, engineer, have invented certain new and useful Improvements in the Production of Alumina suitable for the manufacture of aluminium and other useful purposes, (for which I have applied for Letters Patent in England, No. 2,580, dated June 14, 1881;) and I do hereby declare that the following is a full, clear, and exact description of the invention, which will enable others skilled in the art to which it appertains to make and use the same.

The object of my invention is to produce alumina soluble in acids, to be used in the manufacture of aluminium and for other useful purposes, at a less cost than heretofore.

To carry my invention into effect I take the ordinary alum of commerce, or the sulphate of alumina, or other salts or compounds of alum. For this description I will take the ordinary alum of commerce, which consists, according to Dr. Ure and others, of the following parts: alumina, 13.91; sulphuric acid, 36.24; water, 49.60; sulphate of potassa, 1.50; and I mix therewith about one-third its weight of carbonaceous matter, by preference gas-pitch, which consists chiefly of carbon, with a small portion of sulphur. I then grind this compound to a fine powder and then place it in a flat-bottomed furnace, similar to those used in the manufacture of soda-ash, and heat the same to about 400° to 500° of Fahrenheit's scale, taking care not to raise it higher, thus driving off the water of crystallization, with a small portion of sulphuric acid, from the alum, at which temperature the pitch and sulphur combine together with the alum thus dried. The said temperature is maintained for about three hours, the compound being well stirred and mixed during this time, when it will have attained the consistence of a thick paste. It is then removed from the furnace and placed upon a stone floor, and when cool broken into pieces and moistened with a small quantity of hydrochloric acid and water mixed in the proportion of one volume of acid to four similar volumes of water. This mixture is then thrown in a heap eighteen inches thick, or more, and occasionally turned, so that it may heat and give off sulphureted-hydrogen gas. When such gas ceases to rise from the mixture I add thereto about five per cent. of wood-charcoal or lamp-black and a small quantity of water, if required, for grinding it down to a thick paste, and well mix them. The whole is then removed to a mill or other grinding apparatus and ground to a stiff paste, which is thus constituted: the dried alum, sulphur or sulphurous acid, potassa, hydrochloric acid, (which contains a small portion of iron,) carbon, and water. This paste is then removed from the mill and made into balls, about one pound each, and pierced with some four to six holes to allow the moisture therein to freely escape during the process of drying. The said balls are then placed in a drying-stove previously heated to about 100° Fahrenheit for about two days, when they are transferred to an oven or stove heated to from 200° to 300° Fahrenheit, and thus remain until thoroughly dried. These dried balls are then placed in a vertical retort of fire-clay; or the mixture in the heap, when it ceases to give off sulphureted-hydrogen gas, may be taken therefrom direct to such fire-clay retort, which, in either case, is then heated to a dull-red heat and maintained thereat for about thirty hours. During this time, when the mixture is thus heated, I pass through it a jet of steam and atmospheric air, combined in the proportion of about two volumes of steam to one similar volume of air.

By this process the sulphur, ferric sulphate, with a small quantity of potassa and a trace of alumina are carried over with the vapor and condensed by being passed through earthenware tubes and condensers, similar to the process used in the condensing of nitrous or nitric acid. This condensed vapor or fluid consists, by analysis, of free hydrochloric acid 30.24 per cent.; sulphuric acid ($SO_3$) 2.46 per cent.; sulphate of potassa, 1.37 per cent.; ferric sulphate, 1.24 per cent.; alumina, trace, and which is really hydrochloric acid in a concentrated state, contaminated with free sulphuric acid, sulphate of potassa, and iron. When the said vapor is all given off the dried mixture is removed from the retort and placed to cool. When sufficiently cooled it is again taken to the mill and there ground to a fine powder, which is composed of alumina, potassa, and sulphur. This powder is then placed in a vat or pan with about seven times its weight of water and boiled by steam for about an hour, when the steam is turned off and the contents of the vat allowed to cool. During this process of cooling the alumina will fall to the bottom of the vat as a thick precipitate, the sulphate of potassa, which was left in the alumina, being held in solution by the water. I then draw this liquid off and boil it down dry, when the residue will be found to be the crude sulphate of potassa. The said thick precipitate is further washed with water to free it from any little sulphate of potassa that may remain therein, and is then placed in sacks or frames to drain and dry, which completes the production of alumina as proposed, and which is constituted as follows:

| | |
|---|---|
| Alumina | 90.00 |
| Silica | 5.00 |
| Potassa | trace |
| Sulphuric acid | trace |
| Chlorine | trace |
| Moisture, by difference | 5.00 |
| | 100.00 |

This alumina may now be used for the manufacture of anhydrous chloride of aluminium, or for other purposes where hydrate of alumina or oxide of alumina are now used.

The liquid, containing hydrochloric acid, sulphur, ferric sulphate, and small portions of potassa and alumina, may be drawn from the condensers and be sold or used in the manufacture of colors, in dyeing, printing, and for other similar purposes.

The sale or use of this by-product and the crude sulphate of potassa will considerably reduce the cost of making the alumina. I calculate I shall by my improved process reduce by nearly one-half the present cost of producing it.

Having thus fully described my invention, I hereby declare that I do not claim the mixture of carbonaceous matter with alum, broadly, being aware that prior to my invention such mixture has been used; nor do I claim the jet of steam and air combined, *per se*, being aware that it has been applied to other uses, but never previously, as now applied, to vertical retorts for the production of alumina; but

What I do claim as my invention, and desire to secure by Letters Patent, is—

1. The process of making soluble alumina, consisting in the following steps: first, roasting a mixture of aluminous material with carbonaceous matter; second, treating the compound with dilute acid and allowing it to give off sulphureted hydrogen; third, passing through the compound while heated a jet of steam and air to carry off sulphur and other substances; finally, boiling the residuum and drawing the liquid off after cooling, thus leaving the soluble alumina behind as a precipitate, substantially as set forth.

2. In a process for producing soluble alumina from the alum of commerce and carbonaceous matter, the following steps for reclaiming a by-product: first, treating the above compound with dilute hydrochloric acid; second, subjecting it under heat in a closed vessel to the action of a jet of steam and air, which will carry off the hydrochloric acid slightly tainted by sulphur and ferric sulphide; and, finally, condensing this vapor into liquid form for use in the manufacture of colors and for other purposes.

JAMES WEBSTER.

Witnesses:
  WILLIAM COOKE,
  JAMES BLEE.